March 7, 1944.    L. A. WAGNER    2,343,722
FEED CONTROL DEVICE
Filed Feb. 1, 1940    2 Sheets-Sheet 1

INVENTOR
LACEY A. WAGNER

ATTORNEYS

INVENTOR
LACEY A. WAGNER
ATTORNEYS

Patented Mar. 7, 1944

2,343,722

UNITED STATES PATENT OFFICE 2,343,722

FEED CONTROL DEVICE

Lacey A. Wagner, St. Louis County, Mo., assignor to Missouri Portland Cement Co., St. Louis, Mo., a corporation of Missouri Application February 1, 1940, Serial No. 316,759

8 Claims. (Cl. 221—118)

This invention relates, generally, to feed control devices and particularly to apparatus for regulating the discharge of bulk material from a container so as to maintain uniformity of weight of the material fed per unit of time.

The apparatus of the present invention is particularly adapted for employment in connection with the feeding of cement clinker from storage bins, as in the manufacture of Portland cement. An arrangement more or less conventional in Portland cement plants consists of a storage bin arranged to discharge clinker upon a belt conveyor. The belt conveyor is generally provided with a weighing mechanism, and an effort is made to maintain the flow of clinker across the conveyor at a uniform mass per unit of time.

Heretofore in the apparatus employed in cement plants, control of the feed from the storage bin to the conveyor has been accomplished by mechanism connecting the weighing device to a gate upon the storage bin in such manner that the energy for operation of the gate is derived from movement of the weighing mechanism. Consequently, where the variations in the mass of clinker being carried upon the conveyor are insufficient to have an appreciable effect upon the weighing mechanism, insufficient energy is imparted to the gate operating mechanism by the weighing mechanism to accomplish adjustment of the feed; and as a result the mechanically operated feed control mechanisms heretofore commonly employed have not functioned with a high degree of accuracy.

While efforts have been made to provide electrically controlled feed regulators, such arrangements have involved either a disadvantageous regulation of speed of the conveyor belt, or have failed to provide for gradual yet positive manipulation of the feed gate, so as to accomplish proper regulation of the feed from the storage bin.

The object of the present invention, generally stated, is to provide an apparatus for regulating feed of bulk material, in which the energy for regulating the feed is controlled by but not derived from the material being fed.

A further object of the invention is to provide an apparatus for regulating the feed of bulk material upon a constant speed conveyor which is sensitive to slight variations, positive yet gradual in its action, simple to manufacture, and self regulating.

Other objects will become apparent to those skilled in the art when the following description is read in connection with the accompanying drawings, in which.

Figure 1:
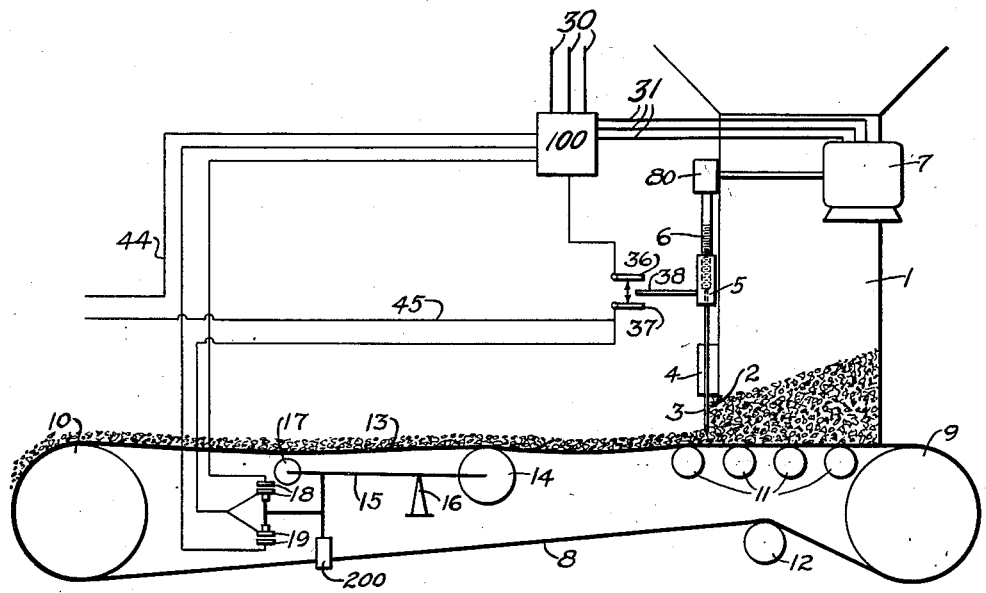
Figure 1 is a diagrammatic view showing the organization of the present invention as applied to a feed mechanism commonly employed in cement plants.
Figure 2:
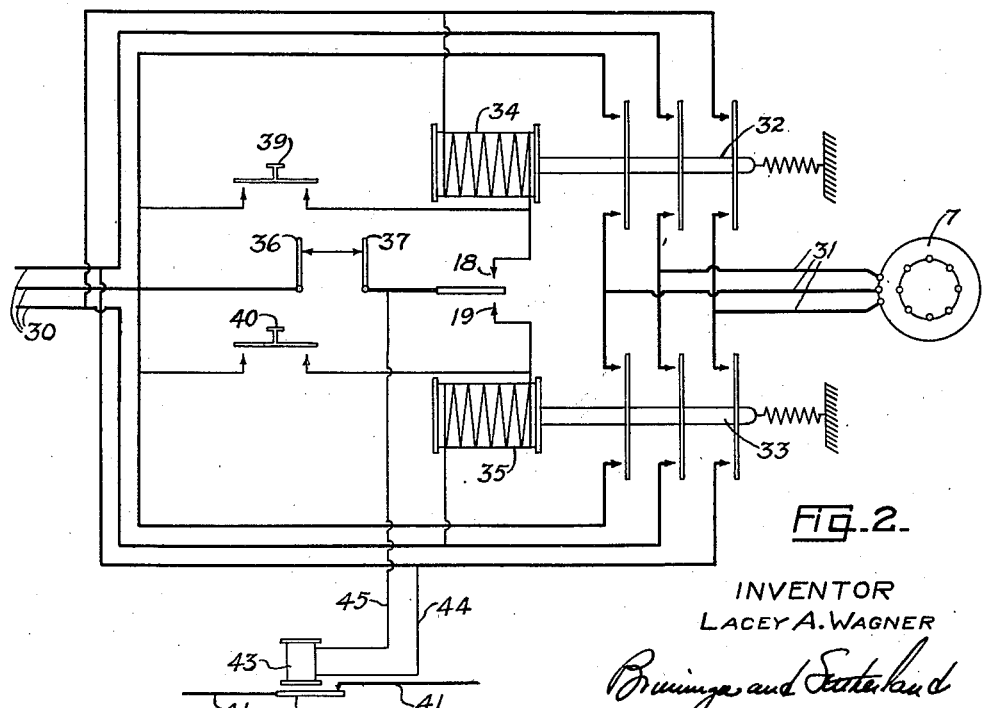
Figure 2 is a wiring diagram of the electrical circuits involved in the embodiment of Figure 1.

The present invention is especially adapted for use in cement mills where it is desired that the flow of clinker from storage to a succeeding operation be maintained uniform, and hence the invention will be herein disclosed with particular reference to such use. In such installations a conveyor of the belt type is generally provided for receiving the clinker from a storage bin (having a feed gate) and delivering it to a grinding device, and intermediate the length of the conveyor a weighing mechanism is provided.

The present invention contemplates, generally, that such weighing mechanism be provided with means for controlling a separate source of energy for adjusting the position of the feed gate in accordance with the position of the weighing mechanism. For example the weighing mechanism may be provided with electrical circuit controlling means, which move in response to movement of the weighing mechanism so as to selectively establish control circuits in accordance with the direction of displacement of the weighing mechanism from its balanced position. In accordance with the present invention, when the weighing mechanism is in balanced position (where the desired mass of material is being carried by the conveyor belt) the electrical circuit controlling means associated with the weighing mechanism is open. Responsive to movement of the weighing mechanism above or below balanced position however the electrical circuit controlling means selectively control energization of a reversible electromotive device, such as a motor, for positively varying the position of the said feed gate in a direction such as to restore the balance of the weighing mechanism. The present invention contemplates that the said gate be gradually yet positively operated by the electromotive means, and consequently suitable mechanism for translating rotary motion into translatory motion is provided; but in order to accomplish gradual movement of the gate, and thereby minimize the possibility of overrunning adjustment, a speed reducing mechanism of any desired form may be provided whereby a multiplicity of rotations of the motor is required to vary the position of the feed gate substantially.

The invention further contemplates the provision of suitable control means for interrupting the operation of the apparatus when the maximum allowable variation in the position of the said gate does not accomplish the desired regulation of the mass of material being fed.

Referring now to the drawings for an illustrative embodiment of the present invention, a storage bin 1 is provided with a discharge outlet 2, and a gate 3 is arranged for vertical adjustment in suitable guides 4 to vary the effective area of opening 2. Connected to the upper end of gate 3 is an internally threaded sleeve 5, intermeshing with a worm 6. A motor 7 is provided for rotating worm 6, which in turn, in accordance with its direction of rotation, either raises or lowers gate 3. In the embodiment shown, the motor 7 is connected through a suitable speed reducing mechanism 80, which for example may be constructed and arranged so as to require a plurality of revolutions of the motor 7 for each revolution of worm 6. The ratio of reduction of speed accomplished by mechanism 80 may of course be varied in accordance with the circumstances of use of the apparatus, the capacity of the motor, and other local conditions, to accomplish the gradual yet positive adjustment of position of gate 3 as desired. Likewise, the pitch of the threads on worm 6 and in sleeve 5 may be varied. For practical operation in a cement plant, however, the worm 6 may be provided with twenty threads per inch, and the speed reduction mechanism 80 arranged to require forty-eight revolutions of motor 7, to each revolution of worm 6.

A belt conveyor 8 is arranged to extend beneath storage bin 1, so as to receive material discharged therefrom through outlet 2. The conveyor belt 8 may be mounted upon a pair of pulleys 9 and 10, suitably driven, as through the agency of an electric motor, not shown. A plurality of idler pulleys 11 may be provided in accordance with the usual practice for sustaining the conveyor belt when, as in the case of the embodiment shown in the drawings, the belt itself constitutes a part of the bottom of bin 1. Another idler pulley 12 may be arranged for adjusting the tension in belt 8.

The conveyor belt 8 is arranged so as to provide a free band 13 extending from pulley 10 to pulleys 11, over which the material discharged from bin 1 is carried.

Arranged intermediate the ends of band 13 of conveyor belt 8 is a weighing mechanism, having a part such as roll 14 engaging the lower surface of belt 8. The weighing mechanism may consist of an arm 15 fulcrumed upon the usual knife edge fulcrum 16, and provided, if desired, with a counterweight 17, which may be adjustable either lengthwise of arm 15 or of adjustable mass in fixed position, in order to maintain arm 15 in a balanced position substantially level when the desired weight of material is being carried by band 13. Any variation in the weight of material on band 13 of belt 8 will effect a variation in the angularity at which arm 15 comes to rest; as for example if the mass of material upon band 13 is less than that desired, arm 15 will rotate slightly in a counter-clockwise direction about fulcrum 16; and conversely, if a greater mass of material than desired is being carried by band 13, rotation of arm 15 about its fulcrum 16 will be in a clockwise direction.

Associated with arm 15 of the weighing mechanism is an electrical circuit controlling means, consisting of a pair of switches 18 and 19, which as shown in the drawings stand open when arm 15 of the weighing mechanism is in its balanced position, as shown.

Figure 3:
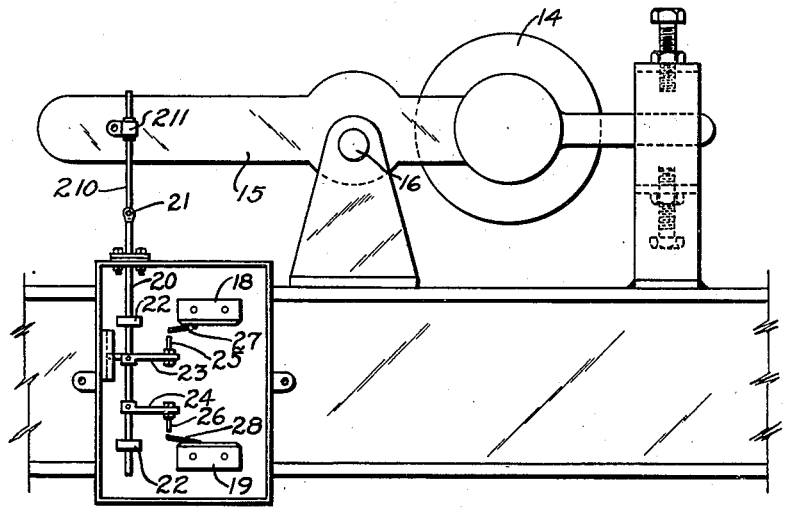
Figure 3 is a detail view in side elevation of the weighing mechanism employed in an embodiment of the present invention.
Figure 4:
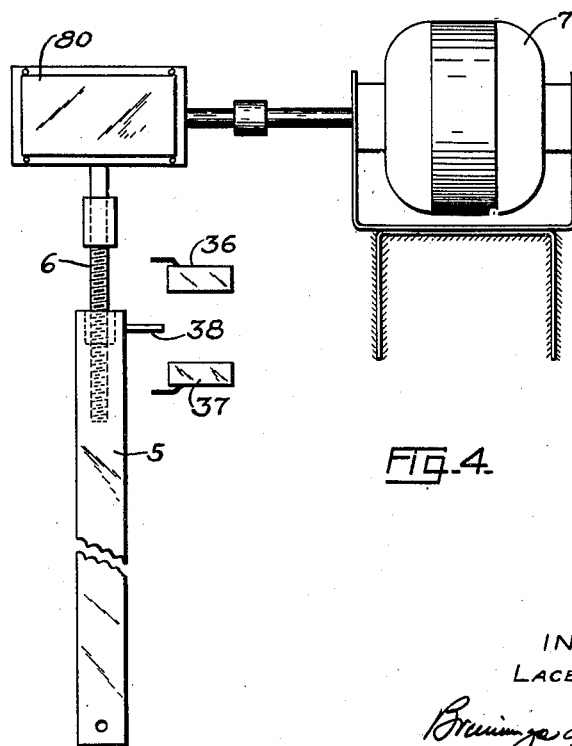
Figure 4 is a detail view in side elevation showing a feed gate operating mechanism of the present invention.

As shown in Figure 3 of the drawings, the weighing mechanism may be provided with a depending rod 20 mounted in suitable guides 22 for vertical movement. Rod 20 is pivoted at 21 to a pitman 210 which, in turn is pivotally connected at 211 to arm 15. Connected to rod 20 is a pair of brackets 23 and 24, each provided at its outer extremity with an adjustable abutment 25 and 26, respectively. Switches 18 and 19 are each provided with a laterally extending actuating part 27 and 29 respectively. In the balanced position shown in the drawings, abutments 25 and 26 are respectively out of contact with parts 27 and 28 of switches 18 and 19. Upward movement of rod 20, in response to overloading of band 13 of conveyor belt 8, will accomplish an engagement of abutment 25 with part 27 of switch 18, so as to complete the circuit controlled by switch 18; and likewise downward movement of rod 20, in response to underloading of band 13 will accomplish engagement between abutment 26 and part 28, so as to complete the circuit controlled by switch 19. With abutments 25 and 26 made adjustable, it is apparent that the device may be regulated so that motor 7 will be responsive to very slight variations in the weight of material carried by band 13.

It will be understood, of course, that switches 18 and 19 are each of a character which normally remain open, and that the circuits through the same are closed only when the respective abutments 25 or 26 contact part 27 or 28.

In the embodiment shown in the drawings, the motor 7 is of a three-phase induction type; but it will be understood that any suitable type of motor may be employed, with appropriate changes in the wiring and control circuits now to be described.

In the embodiment shown in the drawings, motor 7 is supplied with electric current through three-phase supply line 30. Motor 7 is connected through leads 31 to a pair of switches 32 and 33. The switches 32 and 33 are of a type normally maintained open, but are respectively controlled by electromagnetic means 34 and 35; switch 32, when closed, completing the circuit between leads 31 and line 30 in such manner that motor 7 rotates in a direction such as to close gate 3; and switch 33, when closed, completing the same circuit in such manner that the motor 7 operates in the reverse direction.

For energizing the electromagnetic means 34 controlling switch 32, a control circuit is completed through switch 18, and likewise for energizing electromagnetic means 35, a control circuit is completed through switch 19. Connected in series with switches 18 and 19 is a pair of limit switches 36 and 37, which normally remain closed, but are arranged to be opened upon engagement by an arm 38 upon sleeve 5. Consequently when gate 3 is opened to such an extent that arm 38 on sleeve 5 engages limit switch 36, the circuit is open; and likewise when gate 3 is closed to such an extent that arm 38 engages limit switch 37, the latter is opened. Opening either switch 36 or switch 37 interrupts the control circuit, and consequently restores switches 32 and 33 to their normal open position.

In order to answer occasional demand for operating motor 7 in either direction, or for starting it where the limit switches are open, push buttons 39 and 40 may be provided, respectively paralleling limit switches 36 and 37 and control switches 18 and 19.

In the event that it is desired to interrupt operation of the conveyor belt 8 when proper regulation of feed from bin 1 cannot be achieved by the automatic adjustment of the gate 3, provision may be made for interrupting the supply of electric current to the motor (not shown) for driving conveyor belt 8. In order to accomplish this result, the supply line 41 to the main driving motor may be provided with a switch 42, which is provided with an electromagnetic operating means 43, arranged in such manner that the switch 42 is maintained closed when means 43 is energized, but otherwise open. Means 43 may be connected for energization through a lead 44 extending to one of supply lines 30, and a lead 45 extending to another of supply lines 30, but connected in series between lead 45 and its supply line, limit switches 36 and 37 are situated so that upon opening of either limit switch, the circuit to the main motor is interrupted. Thus there is provided an electrical interlock between the feed control and the conveyor drive.

In a practical application the switches 32, 33 and 42 with their adjunct coils may be arranged in a suitable enclosure 100.

In the event that it is not desired to interrupt the operation of the feed belt, as just described, switch 42 may be arranged so as to complete a circuit when electromagnetic means 43 is de-energized. In this instance, the circuit completed by switch 42 upon opening of either of limit switches 36 or 37 might be effective to energize a signalling device, such as a horn or bell. In fact, if desired, the signalling device might be employed together with means for interrupting operation of the feed belt in such cases.

Since in the handling of materials such as cement clinker it frequently occurs that local slight variations of material being fed will occur, and if the device is sufficiently sensitive to respond to such local slight variations, substantially continuous operation, in one direction or the other, of motor 7 will frequently occur and since such local slight variations in the long run tend to balance themselves, it may be desired to buffer the action of the weighing device, as by the provision of a suitable dash pot 200, or equivalent device, upon rod 20.

From the foregoing description, the operation of apparatus will be readily understood by those skilled in the art. Since conveyor belt 8 is driven at a substantially constant speed, regulation of the mass of material delivered thereby is controlled solely through the electrically energized means of adjusting the position of gate 3. If the weight of material traveling upon conveyor 8 is excessive, the weighing device will respond by slight rotation in a clockwise direction, with the result that the control circuit is closed through switch 18, actuating switch 32 to a closed position to complete the circuit to motor 7, whereby the same will be rotated in a direction such as to lower the position of gate 3 and consequently reduce the amount of material fed from bin 1 to conveyor 8. Operation of motor 7 continues in this direction until gate 3 is lowered to an extent such that the weight of material upon band 13 of conveyor 8 permits arm 15 to resume its balanced position (at which point the weighing device would be balanced so that arm 15 is substantially level). When arm 15 approaches balanced position the circuit through switch 18 is broken and energization of motor 7 interrupted. If thereafter the amount of material being carried by conveyor 8 is less than the desired amount the weighing device will rotate in a counterclockwise direction, completing the circuit through switch 19 and effecting the closing of switch 33, to rotate motor 7 in a direction such as to raise gate 3 and thereby increase the flow of material from bin 1. In either event, after the gate 3 has been gradually moved by motor 7 and its adjunct mechanism to a position whereat the weight of material traveling upon conveyor 8 is proper, the weighing device will resume its balanced position whereat both switch 18 and switch 19 will be open. Consequently operation of motor 7 will be interrupted, and gate 3 remain in the position to maintain the regulated flow of material desired.

The arrangement herein disclosed thereby effects a positive and accurate regulation of material being fed by gradual, as distinguished from sudden, variations.

From the foregoing description it is apparent that many modifications of feed control apparatus herein disclosed will present themselves to those skilled in the art, whereby the benefits of the present invention may be obtained without employment of the various features in the precise relation hereinbefore described; and it is therefore to be distinctly understood that such modifications, rearrangements of parts, and applications as may present themselves to those skilled in the art without departing from the spirit of this invention are, although not specifically described herein, contemplated by and within the scope of the appended claims.

Having thus described the invention, what is claimed is:

1. Apparatus for regulating feed from a bin, comprising a bin having an outlet, a motor driven endless conveyor traveling beneath the outlet from the bin, pulleys supporting said endless conveyor but spaced so as to provide a band supported at its ends, a weighing device sustaining a free portion of said band adjacent said outlet, a gate for controlling the feed of material from said bin to said band, an electric motor connected to reciprocate said gate to vary the discharge from said bin, limit switches associated with said gate for interrupting operation of the conveyor motor at extreme positions of the gate, and means for controlling the direction of rotation of said motor in accordance with the position of said weighing device.

2. Apparatus for regulating feed from a bin, comprising, a bin having an outlet, a motor driven endless conveyor traveling continuously at consistent speed beneath the outlet from the bin, pulleys supporting said endless conveyor but spaced so as to provide a band supported at its ends, a weighing device sustaining a free portion of said band adjacent said outlet, a gate for controlling the feed of material from said bin to said conveyor ahead of the free portion of said band, a reversible electric motor connected to said gate for opening and closing the same in accordance with the direction of rotation of the motor, means associated with said weighing device for controlling the direction of rotation of said motor in accordance with the position of said weighing device, and means electrically interlocked with said last-mentioned means operating to interrupt the operation of the conveyor motor under predetermined conditions.

3. Apparatus for regulating feed from a bin, comprising a bin having an outlet, an endless conveyor traveling continuously at constant speed beneath the outlet from the bin, pulleys supporting said endless conveyor but spaced so as to provide a band supported at its ends, a weighing device sustaining a free portion of said band adjacent said outlet, a gate for controlling the feed of material from said bin to said conveyor immediately ahead of the free portion of said band, said gate being movably positioned immediately above the surface of the upper run of the conveyor to provide between the conveyor and the lower edge of the gate a variable passage for the material from the bin, reversible electromotive means for operating said gate, connections from said means to move said gate gradually, control devices for maintaining said electromotive means at rest while said weighing device is in balanced position and for operating said electromotive means when said weighing device is displaced from balanced position, in a direction such as to restore the weighing device to balanced position.

4. Apparatus for regulating feed from a bin, comprising a bin having an outlet, an endless conveyor traveling continuously at constant speed beneath the outlet from the bin, pulleys supporting said endless conveyor but spaced so as to provide a band supported at its ends, a weighing device sustaining a portion of said band adjacent said outlet, a gate for controlling the feed of material from said bin to said conveyor immediately ahead of the free portion of said band, said gate being movably positioned immediately above the surface of the upper run of the conveyor to provide between the conveyor and the lower edge of the gate a variable passage for the material from the bin, rotatable electromotive means arranged to be reversed, mechanism for converting rotating motion into translatory motion connecting said gate and said electromotive means, said mechanism being arranged to require a multiplicity of rotations of said electromotive means to accomplish substantial movement of the gate, and circuit control means for changing the direction of operation of said electromotive means in accordance with the position of said weighing device above or below balance.

5. Apparatus for regulating feed from a bin, comprising a bin having an outlet, a motor driven endless conveyor traveling continuously at constant speed beneath the outlet from the bin, pulleys supporting said endless conveyor but spaced so as to provide a band supported at its ends, a weighing device sustaining a free portion of said band adjacent said outlet, a gate for controlling the feed of material from said bin to said conveyor ahead of the free portion of said band, a reversible electric motor connected to reciprocate said gate to vary the discharge from said bin, switch mechanism for connecting and reversing said motor and for interrupting operation of the conveyor motor, a circuit controlling said switch mechanism, said switch mechanism including control circuit switches mounted for actuation by said weighing mechanism.

6. In combination with a feeding apparatus of the character described having a bin provided with an outlet, a gate for said outlet, an endless conveyor traveling continuously at constant speed beneath said outlet to receive material therefrom, and pulleys supporting said endless conveyor but spaced so as to provide a band supported at its ends, said gate being movably positioned immediately above the surface of the upper run of the conveyor to provide between the conveyor and the lower edge of the gate a variable passage for the material from the bin; regulating means comprising, a weighing device sustaining a free portion of said band immediately adjacent but laterally displaced from said outlet, reversible motor means for raising and lowering said gate, operating connections between said gate and said motor means including speed-reducing mechanism arranged to move said gate gradually, and electrical control connections between said weighing device and said motor means operating to control the direction of movement of the latter in accordance with the position of said weighing means.

7. In combination with a feeding apparatus of the character described having a bin provided with an outlet, a gate for said outlet, an endless conveyor traveling continuously at constant speed beneath said outlet to receive material therefrom, and pulleys supporting said endless conveyor but spaced so as to provide a band supported at its ends, said gate being movably positioned immediately above the surface of the upper run of the conveyor to provide between the conveyor and the lower edge of the gate a variable passage for the material from the bin; regulating means comprising, a weighing device sustaining a free portion of said band immediately adjacent but laterally displaced from said outlet, reversible motor means for raising and lowering said gate, and electrical control connections between said weighing device and said motor means operating upon unbalancing of said weighing device to actuate said motor means to move said gate in such a direction as to change the feed of material from said outlet to restore said weighing device to balanced position.

8. In combination with a feeding apparatus of the character described having a bin provided with an outlet, a gate for said outlet, an endless conveyor traveling continuously at constant speed beneath said outlet to receive material therefrom, and pulleys supporting said endless conveyor but spaced so as to provide a band supported at its ends, said gate being movably positioned immediately above the surface of the upper run of the conveyor to provide between the conveyor and the lower edge of the gate a variable passage for the material from the bin; regulating means comprising, a weighing device sustaining a free portion of said band immediately adjacent but laterally disposed from said outlet, a reversible electric motor connected to raise and lower said gate, and electro-magnetic switching means operated by said weighing means and connected to control the direction of rotation of said motor in accordance with the position of said weighing means.

LACEY A. WAGNER.

CERTIFICATE OF CORRECTION.

Patent No. 2,343,722.  March 7, 1944.

LACEY A. WAGNER.

It is hereby certified that error appears in the printed specification of the above numbered patent requiring correction as follows: Page 4, second column, line 62; claim 8, for "disposed" read --displaced--; and that the said Letters Patent should be read with this correction therein that the same may conform to the record of the case in the Patent Office.

Signed and sealed this 16th day of May, A. D. 1944.

Leslie Frazer (Seal) Acting Commissioner of Patents.